United States Patent [19]

Oosterling et al.

[11] 4,114,814
[45] Sep. 19, 1978

[54] AGRICULTURAL IMPLEMENT

[75] Inventors: Pieter Adriaan Oosterling, Nieuw-Vennep; Antoine Marinus René Baecke, Hoofddorp, both of Netherlands

[73] Assignee: Multinorm, B.V., Nieuw-Vennep, Netherlands

[21] Appl. No.: 767,455

[22] Filed: Feb. 10, 1977

Related U.S. Application Data

[62] Division of Ser. No. 582,978, Jun. 2, 1975, Pat. No. 4,083,257.

[30] Foreign Application Priority Data

| Jun. 4, 1974 | [NL] | Netherlands | 7407517 |
| Jun. 4, 1974 | [NL] | Netherlands | 7407518 |
| Jun. 4, 1974 | [NL] | Netherlands | 7407516 |

[51] Int. Cl.² ............................................. A01C 3/06
[52] U.S. Cl. ..................................... 239/689; 222/232
[58] Field of Search ............... 222/626, 627, 226, 232, 222/245; 239/689, 659, 683

[56] References Cited

U.S. PATENT DOCUMENTS

| 570,490 | 11/1896 | Mead | 222/232 |
| 2,368,127 | 1/1945 | Fasick | 222/232 |
| 3,372,877 | 3/1968 | Vissers | 239/689 X |

Primary Examiner—Stanley H. Tollberg
Attorney, Agent, or Firm—Snyder, Brown & Ramik

[57] ABSTRACT

The invention relates to an agricultural implement comprising a tool oscillating about a vertical axis, for example a spreading pipe of a fertilizer distributor, a mechanism for producing the oscillatory movement of the tool being formed by a rotatably driven flywheel and a coupling element eccentrically in said flywheel and engaging the tool or a holder thereof at a distance to said axis, and comprising a frame carrying the tool and the driving mechanism; the objects of the invention are to provide an improved frame, flywheel and toolholder respectively in particular the arrangement of the bearings relative to each other in order to achieve a more quiet run of the implement resulting in a light weight construction, longer lifetime and lower cost price.

16 Claims, 7 Drawing Figures

AGRICULTURAL IMPLEMENT

This is a division of application Ser. No. 582,978 filed June 2, 1975, now U.S. Pat. No. 4,083,257.

The invention relates to an agricultural implement comprising a tool oscillating about a vertical axis, for example a spreading pipe of a fertilizer distributor, a mechanism for producing the oscillatory movement of the tool being formed by rotatably driven flywheel and a coupling element eccentrically in said flywheel and engaging the tool or a holder thereof at a distance to said axis and comprising a frame carrying the tool and the driving mechanism.

The prime object of the invention is to provide a simpler frame than that of prior-art agricultural implements and to improve the functional features thereof so that a more advantageous engagement of dynamic is obtained. This results in a more quiet run of the agricultural implement so that its lifetime will be longer, whilst simpler and hence cheaper bearing means will satisfy. Owing to the advantageous design the number of component parts of the whole device can be reduced, which involves a low cost price.

The invention provides an agricultural implement whose frame comprises a first annular support for holding the flywheel bearing and a second support for holding the swing bearing of the tool support, the centre line of the first annular support being located in the central perpendicular plane of the swing bearing.

Owing to this specific disposition of the bearings relative to one another the inertia forces of the various reciprocating parts of the agricultural implement are prevented from producing additional bending forces in the bearing stub of the tool and in the bearing holder of the frame respectively.

According to the invention the frame is preferably constructed in the form of at least one curved, bar-shaped body, at the ends of which are arranged the first support and the second support respectively.

If the agricultural implement is a fertilizer distributor comprising a reciprocating spreading pipe, it is preferred to fasten the mass of the implement, that is to say, mainly the mass of the hopper for the fertilizer, which is stationary with respect to the oscillatory movement, to the frame at a point as near as possible to the second support for the swing bearing of the spreading pipe. For this purpose the frame is provided near said second support with supporting means for securing the hopper.

In a second preferred embodiment of the invention two curved, bar-shaped bodies are provided between the first and second annular support for the flywheel bearing and the swing bearing respectively, which two bodies are extending out of the vertical plane through the axis of said annular supports. This embodiment is advantageous when fast oscillating tools are used as the frame is more rigid.

In order to obtain a correct disposition of the supports of the various bearings and the hopper supporting means with respect to one another the bar-shaped frame together with the supports and the supporting means is, in accordance with the invention, made as a single unit by casting.

Further, the invention has for its object to simplify the flywheel for said driving mechanism so that the number of parts for the bearing of the flywheel itself and of the coupling element journalled therein is reduced.

The invention provides such a flywheel design that the flywheel can run quietely so that the lifetime of the various bearings is prolonged.

For this purpose the invention provides an agricultural implement in which the flywheel is provided with a hub firmly fitting around a driving shaft constructed in the form of a bearing stub shaft.

In contrast to the flywheel bearing in known driving mechanisms of the kind set forht above, in which the flywheel is fastened to the end of a driving shaft, which itself is held in bearings, the flywheel itself is directly held in a bearing so that the driving shaft is free of additional bending loads due to the weight of the flywheel and the rotating, eccentric mass of the coupling element and the reactive forces of the driving torque.

The flywheel is preferably shaped in the form of a dish, the hub constructed in the form of a stub shaft being located in said dish. Owing to this design a very simple and light-weight bearing will suffice, since the centre of gravity of the flywheel is located substantially in the radial supporting plane of the bearing so that in operation a substantially reaction-free rotation is obtained.

This advantageous load pattern on the rotary bearing of the flywheel is further improved in accordance with the invention by arranging the centre of the bearing of the coupling element eccentrically affecting the flywheel also in the radial supporting plane of the rotary bearing of the flywheel.

In order to absorb shocks in the driving shaft the latter is preferably connected with the flywheel by an elastic coupling. This flexible coupling in accordance with the invention comprises an externally toothed element connected with the shaft and an internally toothed element connected with the hub. One of these two elements may be made of flexible material. Otherwise it is preferred to arranged a separate flexible element between the toothings of the two elements.

A particularly cheap construction is obtained when the internally toothed element forms part of the flywheel hub.

A further object of the invention is to improve the structure of the tool support so that less material is required and hence the weight, that is to say, the mass to be accelerated and decelerated is reduced, which results in a more quiet operation. A further result is that the lifetime of the various hinge points and bearings is prolonged, whilst the bearings can be made simpler and cheaper.

The invention provides an agricultural implement whose tool support is characterized in that it is provided with a bearing stub, the central vertical plane of which goes through the pivotal point.

With this structure the load on the wing bearing of the tool support applies at the centre so that additional bending moments producing additional stress in the bearing stub are avoided.

When the coupling element is constructed in the form of a fork, whcih engages the tool support at two diametrically opposite pivotal points lying symmetrically to the stub, the tool support is provided at each pivotal point with an eyelet for holding a pivotal stub provided at each end of the fork.

A particularly light-weight structure is obtained by connecting only the eyelets and the bearing stub of the support at the upper ends with one another by means of a strip-shaped web. The lightness of the structure is further improved by constructing the fork with diverging stubs. The fork thus has a reduced width, which considerably reduces the inertia forces produced by the reciprocatory swinging movements about the vertical axis.

In order to facilitate mounting the pivotal stubs, and, if necessary, the bearing stub of the support are constructed in divided form.

In order to ensure a firm and rugged structure the eyelets of the support are subjected to pre-stresses acting in directions towards one another by means of stressing members. In this way any play between support and fork is avoided, which might otherwise occur due to the comparatively thin web eccentrically fastened to the eyelet in operation.

If the agricultural implement constitutes a spreading device for distributing fertilizer or the like, the tool has the form of a spreading pipe fastened to the tool. The support is provided for this purpose at each eyelet with an elongated supporting element fastened at an angle to the web and terminating in a fastening surface.

If the spreading device is provided with a hopper having its outlet port above the tool support, a guide member, preferably of a material of low specific weight is arranged in accordance with the invention between the web and the supporting elements of the spreading pipe, said guide member conveying the material to be distributed from the outlet port of the hopper towards the inlet opening of the spreading pipe. The advantage obtained by the support embodying the invention is that the guide member is mainly located on the same side of the vertical axis of the reciprocatory movements of the support as the spreading pipe so that the delivery of the material to be distributed can be performed undisturbed. In the devices hitherto known material located on the other side of the pivotal axis would accumulate on said side and hamper an undisturbed passage of the material.

In order to ensure a uniform load on the swing bearing the fastening surface of the supporting elements of the tool support is arranged so that the centre line of the spreading pipe is located in the central perpendicular plane of the bearing stub. In this way additional bending moments on the bearing stub are avoided.

In order to further improve a uniform flow of the material to be distributed the support is provided with an agitator extending as far as into the hopper. This agitator is reciprocated with the same frequency as the tool support, it then being advantageous to construct the end of the agitator remote from the supporting member in the form of a bar, extending at a given distance above the supporting elements and parallel thereto.

In this way said end is operative in the lower part of the hopper and ensures a uniform flow irrespective of the degree of filling of the hopper whilst in addition any lumps are broken up.

In roder to reduce the cost of production and to diminish the number of parts the tool support embodying the invention comprising the web, eyelets, bearing stub, supporting elements and agitator is an integral casting.

According to an other embodiment the guide member also forms a part of above mentioned unitary casting, in order to achieve a rigid connection between the web, eyelets, and supporting elements.

Further features of the invention will become apparent from the following description of two embodiments of an agricultural implement forming a fertilizer distributor in accordance with the invention. In the drawing.

Figure 1:
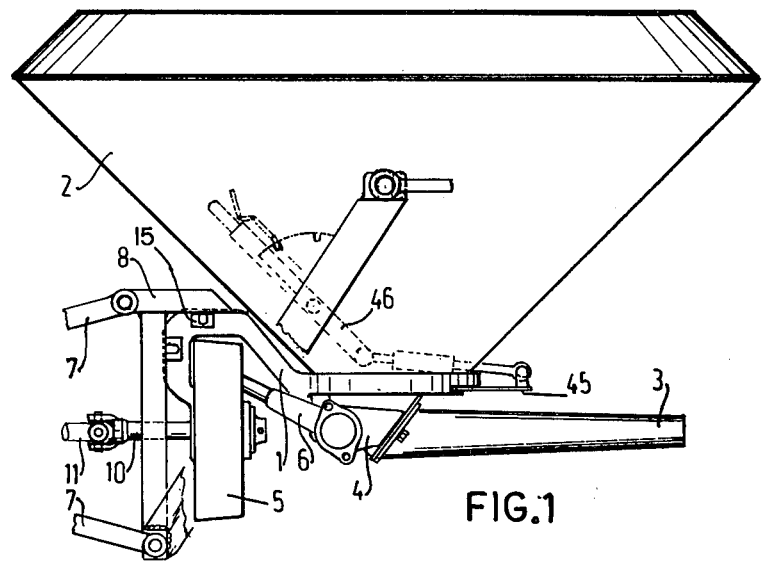
FIG. 1 is a side elevation of a first embodiment of the agricultural implement according the invention.

The agricultural implement according to the invention, described herein by way of a first example, is a fertilizer distributor comprising mainly a frame 1 holding the further elements of the implement, that is to say, the hopper 2, the spreading pipe 3 with a support 4, the flywheel 5 with a coupling element 6. The frame 1 is carried by a frame 8 fastened to the three-point suspension 7 of an agricultural tractor, the frame 1 being secured to the frame 8, the example, by means of bolts 9. The flywheel 5 is rotatably driven by a driving shaft 10, which is connected through a coupling element with the power take-off shaft 11 of the agricultural tractor. It should be noted that the frame 8 may have any design: for example, it may be self-riding, whilst the driving shaft 10 may be caused to rotate by any suitable means.

The frame 1 essentially formed by a bar-shaped body bent over in a suitable manner (see FIGS. 2 and 3), the ends being provided with an annular support 12 for holding the bearing of the flywheel 5 and with a support 13 for holding the swing bearing of the tool or the tool support 4 respectively, the latter support also being annular in this embodiment. According to one aspect of the invention the centre line of the support 12 is located in the central perpendicular plane of the support 13 (see the dot-and-dash line A–A', indicating partly the center line and partly the line of intersection of the central perpendicular plane with the plane of the drawing).

According to a further aspect of the invention a part of the frame 1 in the immediate proximity of the support 13 is provided with a supporting member 14 for positioning the fertilizer hopper held by a strut of the frame 8. In the embodiment shown this supporting member 14 has an annular shape, its center line E—E being substantially parallel to the center line C—C In a part located between the two supports 12 and 13 the bar-shaped frame 1 has a bend of about 90°, on either side of which fastening means are provided for firmly securing the frame 1 to the supporting frame 8. The fastening means are preferably formed by projecting ears 15 provided on the bar-shaped frame 1, said ears receiving fastening bolts 9.

The frame 1 together with the supports 12, 13 and 14 and the ears 15 can be effectively cast as a single unit.

Figure 2:
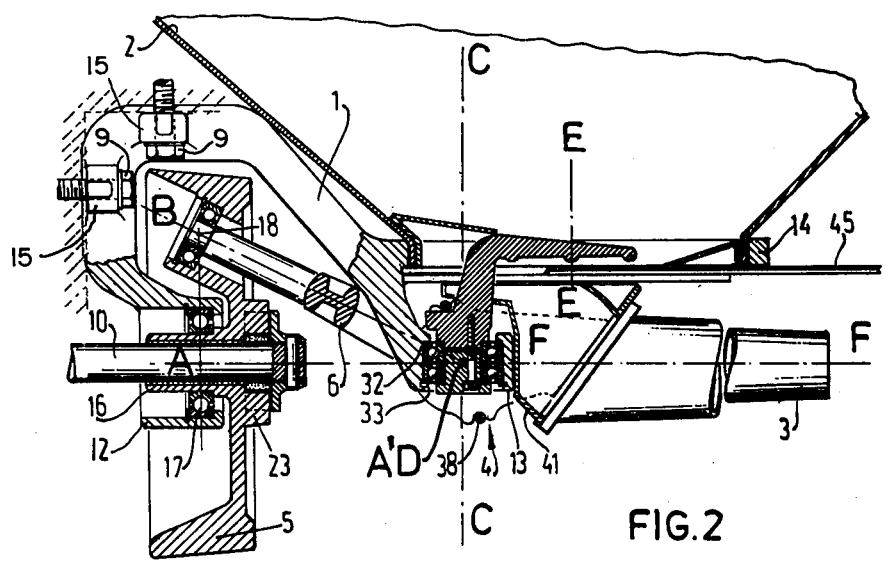
FIG. 2 is an enlarged vertical sectional view of the agricultural implement of FIG. 1.
Figure 3:
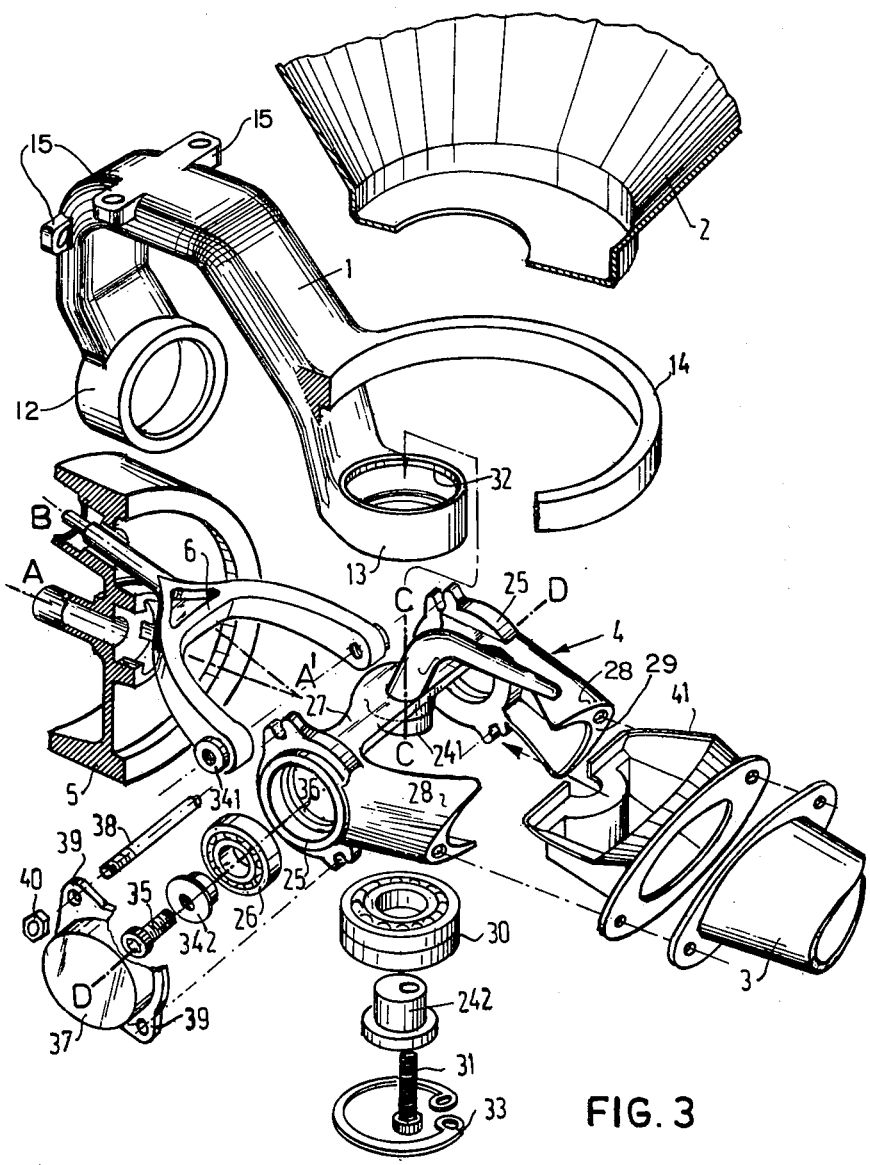
FIG. 3 is a perspective and exploded view of the agricultural implement of the preceding FIGS.
Figure 4:
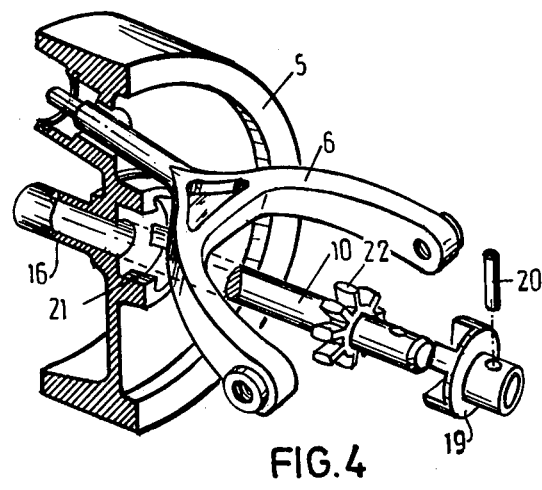
FIG. 4 is a perspective and exploded view of a detail in FIG. 3, showing flywheel and coupling.

The flywheel is shown in detail in FIGS. 2, 3 and 4. The flywheel 5, in accordance with a main feature of the invention, is provided with a hub 16 serving as a bearing stub, fitting around the driving shaft 10. The bearing in this embodiment is a single-row ball bearing 17, the outer ring of which is held in an annular support 12 of the frame 1, whereas the inner ring directly receives the hub 16.

The coupling element 6, formed in this embodiment by a fork engaging a tool holder 4 on either side of its pivotal axis C—C, has its stem eccentrically journalled in the flywheel 5 so that upon rotation of the flywheel the centre line of the fork stem describes a conical plane.

One feature of the invention is that the centre of the bearing 18 for the fork stem is located in the radial supporting plane of the bearing 17. The line A–B in FIG. 2 indicates the line of intersection of said supporting plane with the plane of the drawing. The flywheel 5 has the shape of a dish, the part of the hub 16 serving as a bearing stub being located in the dished space.

The driving shaft 10 is fastened to the flywheel 5 via a toothed coupling (FIG. 4), whose coupling part having external toothing 19 is arranged by a pin 20 on the end of the shaft 10, whereas the coupling part 21 having internal toothing directly forms part of the hub 16. Between the two toothings is arranged a flexible body 22, for example, of rubber.

Between the remaining part of the hub 16 and the part of the driving shaft 10 located therein there is arranged a sleeve 23 with low friction coeeficient in order to allow small relative turns of the driving shaft 10 with respect to the flywheel 5.

In the prime embodiment the tool support 4 comprises a bearing stub 24, divided into two portions 214 and 242 in order to facilitate mounting of the support in the frame 1 (FIG. 3). The support 4 is furthermore provided with two eyelets 25 located diametrically opposite one another with respect to the stub 24 for receiving a roller bearing 26, which serves as a pivotal joint between the coupling element 6 and the tool support 4.

The top ends of the eyelets 25 and the stub 24 are interconnected by a plate shaped web 27. Each eyelet 25 is furthermore provided with a supporting element 28, which is at an angle to the web 27, the two supporting elements extending in the same direction. The supporting elements 28 terminate in a fastening surface 29, to which the tool 3, in this case a spreading pipe, can be secured, for example, by bolts.

On the bearing stub 24 of the tool support 4 is arranged a roller bearing, in this case, two identical ball bearings 30, which are fixed in place by the stub portion 242 inserted from below and the passing bolt 31, screwed into the stub portion 241. The bearing 30 is mounted in an annular support 13 of the frame 1 and held therein between a shoulder 32 and a circlip 33.

In this agricultural implement the coupling element 6 is formed by a fork, the ends of which are each provided with a bearing stub 34. The stub 34 is divided into a portion 341 fastened to the fork and a loose portion 342. The roller bearing 26 is fastened to the stub by means of the bolt 35 passed through the loose portion 342 and screwed into the fixed portion 341. The bearing 26 is held in place in the eyelet 25 of the tool support 4 between a shoulder 36 of the eye let 25 and a cover 37 closing the eyelet 25 on the outer side. The two covers 37 on the outer side are drawn to one another by two pull rods 38, which are located diametrically opposite one another and are passed through ears 39 of the cover 37, a nut 40 being screwed onto each screw-threaded end of the pull rod 38. Owing to this pre-stressing structure it is ensured that despite its comparatively light structure the support 4 can absorb heavy forces, whilst play-free mounting of the bearings 26 in the eyelets 25 is obtained. This means that the lifetime of the pivotal points 25, 26 and 34 is prolonged and that these points can be implemented in a simple manner. Owing to the outwardly extending bearing stubs 34 the fork 6 may have a small width so that inertia forces are reduced.

The fork stem of the coupling element 6 is journalled eccentrically in the flywheel 5 so that upon rotation of the flywheel 5 about its center line A-A' the center line B-A' describes a conical plane. Owing to this movement the support 4 will swing about the vertical pivotal axis C—C, the stubs 34 thus also swinging about the axis D—D in the eyelets 25.

An essential feature of the invention is that the axes A-A', B-A', C—C and D—D intersect one another at the same point, which is, moreover, located in the central perpendicular plane of the bearing stub 24.

When the driving mechanism depicted above is employed in a fertilizer distributor shown in FIG. 1, the frame 1 is provided with a supporting member 14 for the hopper 2 for the fertilizer. The tool is formed by a spreading pipe 3, while a guide element 41 is arranged between the outlet port of the hopper 2 and the inlet opening of the spreading pipe 3. This guide element 41, preferably made of a material of low specific weight, is arranged between the supporting elements 28 projecting from the eyelets and the web 27. The supporting element 41 is furthermore provided with a flange so that the guide element 41 can be fastened by the same bolts as used for fastening the spreading pipe 3 to the supporting elements 28 at the fastening surface 29.

Since the guide element 41 together with the spreading pipe 3 is located on the same side of the pivotal axis C—C, an undisturbed passage of the material to be spread, the fertilizer, is ensured, because the accelerating effect of the oscillatory movement on the fertilizer is already felt when the material is located in the guide element 41.

At its side remote from the bearing stub 24 the web 27 is provided with an agitator 42, which extends in the preferred embodiment as far as into the hopper 2, it is true, but the end of which is bent over towards the supporting elements 28 so that said end extends substantially parallel to said supporting elements. The end of the agitator thus moves substantially in the plane of the outlet port of the hopper 2, any non-uniform passage of the material to be spread being thus avoided. Moreover, said end reciprocates with the same speed as the tool support 4.

One of the essential features of the invention is that the tool support 4 is formed by a single cast unit together with the bearing stub 24, the eyelets 25, the web 27 and the supporting elements 28 and the agitator 42. It should be noted that the fastening surface 29 is arranged so that the centre line F—F of the spreading pipe 3 also passed through the point of intersection of the further centre lines, so that it is also located in the central perpendicular plane of the stub 24.

It is preferred to construct the free end of the agitator with a "loosening" profile in cross section, which is important in casting as well as in the operation so that no material will stick to the agitator.

Figure 5:
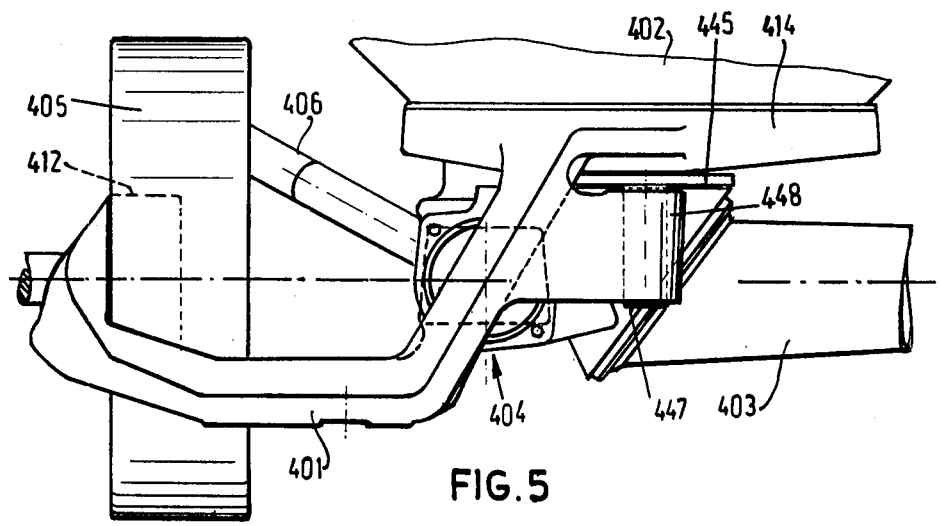
FIG. 5 is a side elevation, corresponding with FIG. 1, of a second embodiment of an agricultural distributor.
Figure 6:
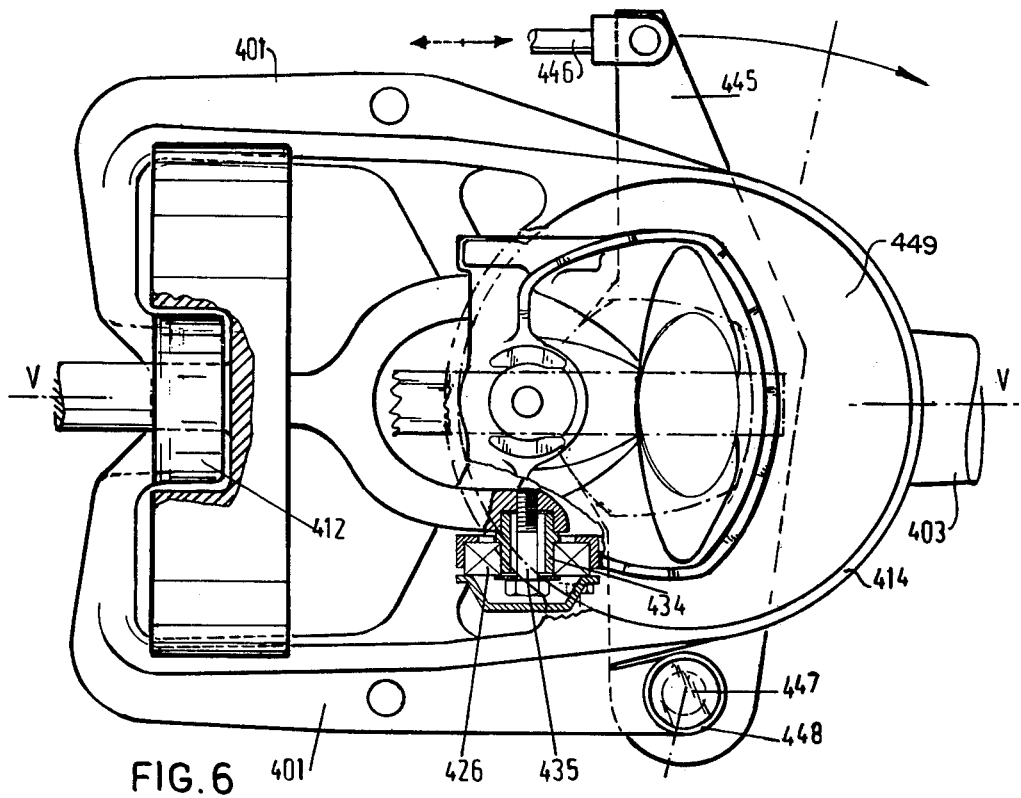
FIG. 6 is a plan view, partly in intersection, of the implement in FIG. 5.
Figure 7:
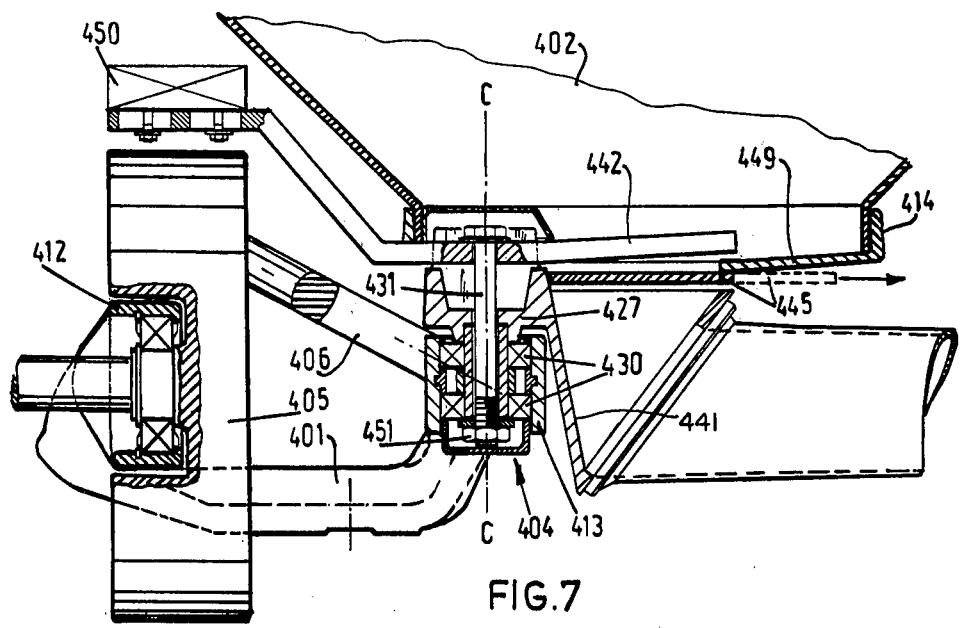
FIG. 7 is a vertical sectional view of the implement in FIG. 5.

Referring now to FIGS. 5, 6 and 7, the second embodiment of the invention is also applied to a fertilizer distributor.

The prime difference with the above described first embodiment is the frame construction. Instead of one curved, bar-shaped body between the first support 412 of the flywheel bearing and the second support 413 of the swing bearing of the tool holder 403, in the present embodiment two curved, bar-shaped bodies are arranged so, that they extend at a distance to the vertical plane (V—V) through the both bearing axis, FIG. 6. This arrangement is very advantageous when fast oscillating tools are used as the frame is more resistant now to bending and torsional forces.

The agitator 442 is bolted by means of a tensioning bolt 431 on the tool holder 404, FIG. 7, and is provided with a counter-balance 450, located above the flywheel 405, and mounted on an forward extension opposite to the active portion of the agitator 422. The counter balance is adapted to balancing the oscillating mass.

The tensioning bolt 431 is passed through the stub 424 and by fastening the nut 451 on the threaded portion of the bolt the loose portion of the stub 424, both roller bearings 430 as well as the agitator 442 are fixed to the tool holder 404 simultaneously.

The separating plane of the outwardly directed fork stubs 434 of the coupling element 406 does not lay outside the fork but is countersunk therein. A bolt 435 screwed in the fork, is adapted to secure the roller bearing 426 and the loose portion of the stub 434 to the fork, FIG. 6.

A further essential feature of the second embodiment according to the invention is the unitary casting formed by the tool holder and the guide element 441 for guiding the fertilizer on its way from the hopper 402 to the spreading pipe 403. The unitary casting results in a more rigid tool holder as is important using fast oscillating tools.

Further the invention relates a dosing member to dosing the mass flow of the fertilizer through the spreading pipe. The said dosing member is according to the invention movably from and towards the vertical swing axis C—C of the tool holder and located at the same side of said axis C—C as the spreading pipe is positioned. The first embodiment of the dosing member according to the FIGS. 1-4 consists of a rectilinear sliding plate 45 engaged by a control mechanism 46, adapted to be adjusted in order to bring the slide-plate in distinct dosing positions. The second embodiment of the dosing member according to FIGS. 5-7 consists of a swingable plate 445 turning about a pin 447, passed through a casted eyelet 448 of the tool holder 404. The control mechanism 446 engages the dosing plate at a distance from the pin 447.

The annular hopper support 414 is provided with a bottom wall 449 preferably arched, FIG. 7, having an aperture to be closed by said dosing member 445. Said aperture is also located at the same side as the spreading pipe 403 in relation to the swing axis C—C. This arrangement causes the fertilizer to flow undisturbed from hopper to spreading pipe. The bottom wall 449 is preferably casted as unitary casting with the frame 401.

The invention is, of course, not only suitable for use in the agricultural distributor described above, since it may also be employed for a multi-beam harrow, the harrow beams performing an oscillatory movement by means of a flywheel shown in the Figures, a coupling element and a tool support, which is caused to reciprocate. A frame required for such a device differs from the embodiment shown in that the annular support 14 for the hopper 2 is dispensed with. The further features with their advantages are maintained.

What is claimed is:

1. An agricultural implement comprising a distributor for fertilizer and the like, comprising in combination:

a frame adapted to be attached to a powered vehicle and a hopper on said frame, said hopper having a bottom opening and said frame including support means located below and to one side of said opening;

a tool support journalled in said support means about a generally vertical axis and a spreading pipe having an inner end portion disposed in horizontally spaced relation from said axis toward said bottom opening of the hopper and extending therefrom generally horizontally away from said axis to terminate in an outer end portion from which fertilizer and the like is discharged, said inner end portion of the spreading pipe defining an upwardly facing material-receiving opening immediately below said bottom opening of said hopper; and drive means for rapidly oscillating said tool support relative to said frame about said axis whereby to whip said outer end portion of the spreading pipe back and forth to broadcast material over the ground surface;

both said bottom opening and said material-receiving opening as well as said inner end portion of the spreading pipe being located in spaced relation to and to the same side of said axis whereby all material passing through said bottom opening and said material-receiving opening into said material-receiving portion is subjected to centrifugal force which causes such material to be discharged outwardly through said outer end of the spreading pipe.

2. An agricultural implement as defined in claim 1 wherein said tool support comprises a downwardly projecting stub shaft journalled in said support means, a transverse web joined to said stub shaft and from which the latter depends, and a pair of eyelets one on each end of said web, said eyelets defining a transverse pivot axis about which said drive means is connected to said tool support.

3. An agricultural implement as defined in claim 2 wherein said frame includes an annular support which rotatably journals said drive means, said annular support defining a generally horizontal axis intersecting said generally vertical axis substantially centrally of said support means.

4. An agricultural implement as defined in claim 1 wherein said frame includes an annular support which rotatably journals said drive means, said annular support defining a generally horizontal axis intersecting said generally vertical axis substantially centrally of said support means.

5. An agricultural implement as defined in claim 2 wherein said tool support includes a pair of support elements, one projecting from each of said eyelets in the direction of said spreading pipe and presenting fastening surfaces, said spreading pipe being detachably secured to said supporting surfaces with said inner end portion being disposed between said support elements.

6. An agricultural implement as defined in claim 3 wherein said tool support includes a pair of support elements, one projecting from each of said eyelets in the direction of said spreading pipe and presenting fastening surfaces, said spreading pipe being detachably secured to said supporting surfaces with said inner end portion being disposed between said support elements.

7. An agricultural implement as defined in claim 4 wherein said tool support includes a pair of support elements, one projecting from each of said eyelets in the direction of said spreading pipe and presenting fastening surfaces, said spreading pipe being detachably secured to said supporting surfaces with said inner end portion being disposed between said support elements.

8. An agricultural element as defined in claim 5 wherein said tool support including said stub shaft, said web, said eyelets and said support elements is formed as an integral casting.

9. An agricultural implement as defined in claim 1 including agitator means mounted for oscillation about said generally vertical axis and having an end portion projecting through said bottom opening into said hopper.

10. An agricultural implement as defined in claim 9 wherein said agitator means is integral with said tool support.

11. An agricultural implement as defined in claim 9 wherein said agitator means is separate from said tool support.

12. An agricultural implement as defined in claim 11 wherein said agitator means includes a free end portion projecting oppositely from said spreading pipe, and counterbalance means on said free end portion.

13. An agricultural implement as defined in claim 1 including a dosing member for controlling the feed area of said bottom opening.

14. An agricultural implement as claimed in claim 13 comprising a dosing member which shuts off the outlet port of the hopper, characterized in that said dosing member is movable toward or from said swing axis at the side of the spreading pipe.

15. An agricultural implement as claimed in claim 14, characterized in that, said dosing member consists of a slide plate, engaged by an adjustable control mechanism.

16. An agricultural implement as claimed in claim 14, characterized in that said dosing member is swingable about a shaft parallel to and at a distance to said vertical swing axis while engaged by an adjustable control mechanism at a point apart from said shaft.

* * * * *